(12) United States Patent
Soma et al.

(10) Patent No.: US 11,197,262 B2
(45) Date of Patent: Dec. 7, 2021

(54) SYSTEMS AND METHODS OF ROOM PROFILING USING WIRELESS LOCAL AREA NETWORKS

(71) Applicant: Dell Products, LP, Round Rock, TX (US)

(72) Inventors: Dileep Kumar Soma, Austin, TX (US); Kamal J. Koshy, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 114 days.

(21) Appl. No.: 16/530,978

(22) Filed: Aug. 2, 2019

(65) Prior Publication Data

US 2021/0037498 A1 Feb. 4, 2021

(51) Int. Cl.
*H04W 64/00* (2009.01)
*H04B 17/318* (2015.01)
*H04W 84/12* (2009.01)

(52) U.S. Cl.
CPC ........ *H04W 64/003* (2013.01); *H04B 17/318* (2015.01); *H04W 84/12* (2013.01)

(58) Field of Classification Search
CPC ... H04W 64/003; H04W 84/12; H04B 17/318
See application file for complete search history.

(56) References Cited

U.S. PATENT DOCUMENTS

| | | | |
|---|---|---|---|
| 8,838,376 B2 | 9/2014 | Garin | |
| 8,847,754 B2 | 9/2014 | Buchheim | |
| 8,874,129 B2 | 10/2014 | Foruntanpour | |
| 9,168,656 B1 | 10/2015 | Wang | |
| 9,204,257 B1 | 12/2015 | Mendelson | |
| 9,619,989 B1* | 4/2017 | Ewing | G08B 21/245 |
| 9,674,658 B2 | 6/2017 | Partheesh | |
| 9,677,890 B2 | 6/2017 | Yang | |
| 9,781,575 B1* | 10/2017 | Wan | H04W 4/029 |
| 9,802,322 B2 | 10/2017 | Angle | |
| 10,140,769 B2 | 11/2018 | Kim | |
| 10,257,715 B2 | 4/2019 | Egner | |
| 10,278,154 B2 | 4/2019 | Ronen | |

(Continued)

*Primary Examiner* — Jeffrey M Rutkowski
*Assistant Examiner* — Jasper Kwoh
(74) *Attorney, Agent, or Firm* — Prol Intellectual Property Law, PLLC; H. Kenneth Prol

(57) ABSTRACT

A method of creating a profile of a room via a plurality of wireless local area network (WLAN) access points may include determining, via a processor executing code instructions of an information handling system, a location fingerprint of a plurality of location data points of an information handling system relative to a plurality of address-identified access points; detecting a received signal strength indicator (RSSI) between the location data points of the information handling system and the access points and a time of flight (TOF) signal distance between the information handling system and the plurality of WLAN access points; and comparing the RSSI to a time of flight (TOF) signal between the location data points and the plurality of address-identified access points to: establish a location fingerprint for the location data points; and detect a reduction in power related to the RSSI passing through a barrier via a network interface device of the information handling system with at least one identified access point to define a barrier location.

20 Claims, 5 Drawing Sheets

(56) References Cited

U.S. PATENT DOCUMENTS

| | | | |
|---|---|---|---|
| 2007/0052534 A1* | 3/2007 | Bird | G01S 5/0284 340/539.13 |
| 2008/0157957 A1* | 7/2008 | Pitchers | H05B 47/10 340/539.1 |
| 2011/0305337 A1 | 12/2011 | Devol | |
| 2014/0376529 A1* | 12/2014 | Ramachandran | H04W 16/18 370/338 |
| 2015/0031390 A1 | 1/2015 | Robertson | |
| 2015/0289094 A1 | 10/2015 | Jang | |
| 2016/0282862 A1 | 9/2016 | Duffley | |
| 2018/0152848 A1 | 5/2018 | Egner | |
| 2018/0160441 A1 | 6/2018 | Egner | |
| 2018/0367314 A1 | 12/2018 | Egner | |
| 2019/0149994 A1* | 5/2019 | Antwerp | H04W 12/06 726/4 |
| 2020/0162980 A1* | 5/2020 | Kalkunte | H04W 36/03 |

* cited by examiner

SYSTEMS AND METHODS OF ROOM PROFILING USING WIRELESS LOCAL AREA NETWORKS

CROSS REFERENCE TO RELATED APPLICATIONS

Related subject matter is contained in the following applications:

U.S. application Ser. No. 16/538,793, filed Aug. 12, 2019, entitled "METHOD AND APPARATUS FOR WIRELESS SIGNAL BASED LOCATION SECURITY SYSTEM," invented by Kamal J. Koshy et al., and assigned to the assignee hereof.

U.S. application Ser. No. 16/538,769, filed Aug. 12, 2019, entitled "METHOD AND APPARATUS FOR LOCATION AWARE OPTIMAL WIRELESS LINK SELECTION SYSTEM," invented by Kamal J. Koshy et al., and assigned to the assignee hereof.

FIELD OF THE DISCLOSURE

The present disclosure generally relates to an information handling system. The present disclosure more specifically relates to implementation of communication channels within a network associated with an information handling system to identify rooms within an architectural space.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, communications with the information handling system may occur wirelessly via access to access points or base stations located within range of a network interface of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings Embodiments of the present disclosure provide for a method of creating a profile of a room that includes determining a location fingerprint of a plurality of location data points of an information handling system relative to a plurality of address-identified access points; detecting a received signal strength indicator (RSSI) between the location data points and the address-identified access points; and comparing the RSSI to a time of flight (TOF) signal between the location data points and the plurality of address-identified access points and detect a reduction in power related to the RSSI passing through a barrier via a network interface device of the information handling system with at least one identified access point to define a barrier location. This method may be implemented to define rooms within a building a network is deployed within by identifying barriers placed between the information handling systems and any and/or all access points. The processes and methods descried herein allow for any type of network to be used so as to provide data to a number of information handling systems and access points as to which room any given information handling system is located within. The processes and methods may also allow for setting profiles to be implemented based on the detected location of the information handling system. According to the principles described herein, the methods and systems described herein allow for the architectural layout of the building to be determined without data of an architectural plan being provided to the access points and/or information handling system. Instead, the systems and methods allow for the discovery of walls, floors, and/or ceilings to be conducted based on the RSSI and TOF values. This allows for a network to use any, all, and/or additionally added network devices (i.e., access points and information handling systems) to particularly define what room the information handling systems are within. Still further, the methods and systems do not implement global positioning systems in order to discover locations of any of the access points and/or information handling systems thereby reducing the costs associated with the discovering the layout of the building.

Figure 1:
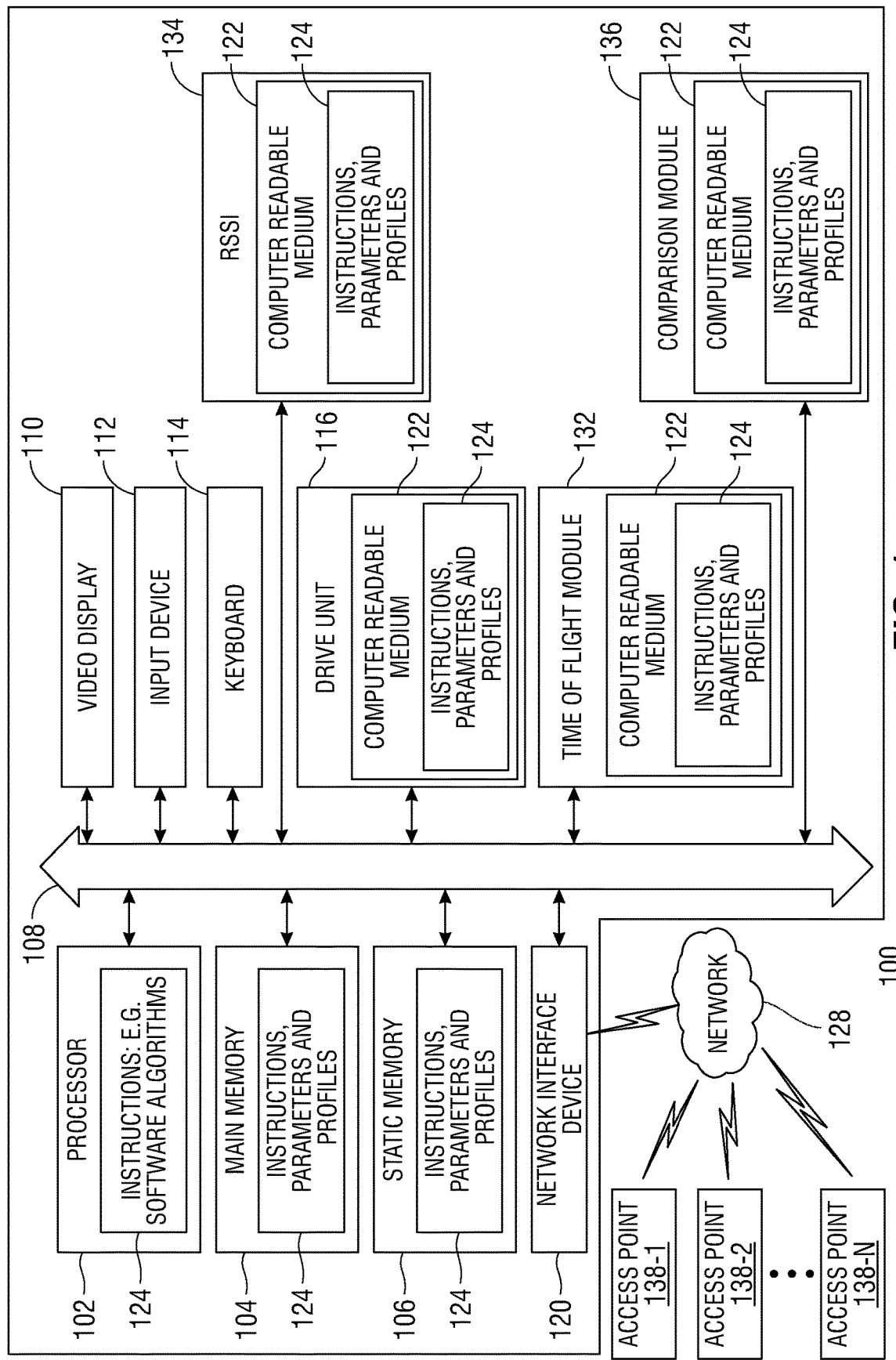
FIG. 1 is a block diagram illustrating an information handling system according to an embodiment of the present disclosure.

FIG. 1 illustrates an information handling system 100 similar to information handling systems according to several aspects of the present disclosure. In embodiments presented herein, the information handling system 100 may include the information handling system 100 forming part of a wireless network and communicatively coupled to a plurality of access points 138-1, 138-2, 138-N. In an embodiment, the information handling system 100 may be any computing device that interacts with the access points 138-1, 138-2, 138-N so as to communicate with the access points 138-1, 138-2, 138-N and/or other devices communicatively coupled to the information handling system 100 shown in FIG. 1.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality. Although the present disclosure may refer to the use of a plurality of access points (i.e., wireless access point (WAP)) and at least one information handling system as being an interaction between a Wi-Fi device and a computing device, respectively, the present specification contemplates that other devices may be used in the present system as described herein.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Elements within the information handling system 100 can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. Elements of the information handling system 100 can also include one or more buses operable to transmit communications between the various hardware components. Portions of an information handling system 100 may themselves be considered information handling systems 100.

Elements of the information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, access points, client devices, data points, or on-box in individual client information handling systems according to various embodiments herein. In some embodiments, it is understood any or all portions of code instructions 124 may operate on a plurality of information handling systems 100.

Elements of the information handling system 100 may include a processor 102 such as a central processing unit (CPU), control logic or some combination of the same. Any of the processing resources may operate to execute code that is either firmware or software code. Moreover, elements of the information handling system 100 can include memory such as main memory 104, static memory 106, computer readable medium 122 storing instructions 124 of the electropermanent magnet keyboard control system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

Elements, such as the information handling system 100 may further include a video display 110. The video display 110 in an embodiment may function as a liquid crystal display (LCD), an organic light emitting diode (OLED), a flat panel display, a solid-state display, or a cathode ray tube (CRT). Additionally, the information handling system 100 may include an input device 112, such as a cursor control device (e.g., mouse, touchpad, or gesture or touch screen input, and a keyboard 114. The information handling system 100 can also include a disk drive unit 116.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 GHz frequency band such as 802.11a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

Elements of the information handling system 100 can include a set of instructions 124 that can be executed to cause the computer system to perform any one or more of the methods or computer-based functions disclosed herein. For example, instructions 124 may execute a received signal strength indicator (RSSI) module 134 and/or a comparison module 136, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the electropermanent magnet keyboard control system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. In an embodiment, the main memory device 104 or any other memory device may maintain certain data used to implement the processes and methods described herein. This data may include an RSSI value associated with each of the access points 138-1, 138-2, 138-N, a TOF signal between the information handling system 100 and each of the access points 138-1, 138-2, 138-N; and/or a media access control (MAC) address associated with each of the access points 138-1, 138-2, 138-N.

The disk drive unit 116 and static memory 106 may also contain space for data storage. Further, the instructions 124 may embody one or more of the methods or logic as described herein. For example, instructions relating to the electropermanent magnet keyboard control system 132 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the electropermanent magnet keyboard control system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The RSSI module 134 and/or comparison module 136 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In an embodiment, the information handling system 100 may include the RSSI module 134 that may be operably connected to the bus 108. The RSSI module 134 computer readable medium 122 may also contain space for data storage. The RSSI module 134 may, according to the present description, perform tasks related to measuring a power present in a received wireless signal such as a signal received by the information handling system 100 from a plurality of access points 138-1, 138-2, 138-N. In an embodiment, the RSSI module 134 may be in the form of computer readable program code executable by the processor 102 that receives signal strength data from, for example, the network interface device 120 or other device associated with the information handling system 100. In an embodiment, the RSSI module 134 may be in the form of an application specific integrated circuit (ASIC) that receives signal strength data from the network interface device 120. During operation of the information handling system 100, a drop in measured power in the received wireless signal by the network interface device 120 and analyzed by the RSSI module 134 may indicate a physical barrier being placed between the information handling system 100 and any of the access points 138-1, 138-2, 138-N. In some examples, this allows the data received by the information handling system 100 by the plurality of in-range access points 138-1, 138-2, 138-N to be used to define metes and bounds of an area such as a room the information handling system 100 is present within relative to the plurality of address-identified access points. Address-identification for the access points 138-1, 138-2, 138-N may be MAC addresses for example. This may also increase the knowledge of the physical layout of a plurality of rooms defined within an architectural plan of a building the information handling system 100 is present within.

In an embodiment, the RSSI module 134 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. This communication allows for the RSSI module 134 to receive the data related to the signal strength of a received signal from an access point 138-1, 138-2, 138-N and provide data representative of any decrease in signal strength over some period of time (i.e., over nanoseconds).

In an embodiment, the information handling system 100 may include a time of flight module 132 that may be operably connected to the bus 108. The time of flight module 132 computer readable medium 122 may also contain space for data storage. The time of flight module 132 may, according to the present description, perform tasks related to measuring the time interval taken by a signal through a medium. In a specific embodiment, the time of flight module 132 may measure the duration of time a signal is sent to or received by one or more access points 138-1, 138-2, 138-N and a response signal is received by or sent by (respectively) an information handling system 100. In this embodiment, the time of flight data may include timestamp data from the access points 138-1, 138-2, 138-N that indicates when the access points 138-1, 138-2, 138-N sent the signal thereby indicating the time of flight value. Alternative embodiments include a series of signals passed between the information handling system 100 and any individual access point 138-1, 138-2, 138-N so as to determine an average time of flight value over the series of sent signals. Again, the signal sent to and from the access points 138-1, 138-2, 138-N and/or information handling system 100 may include a time stamp indicating the time the signal was sent. Further, by sending multiple signals to and from the information handling system 100 and access points 138-1, 138-2, 138-N, any reduction in the RSSI module 134 may be continually confirmed and evaluated to determine that reduction in signal strength is persistent. This is especially true when the information handling system 100 is moved from place to place within any physical room of the architectural plan of the building. Indeed, during operation of the information handling system 100, as described herein, the information handling system 100 may create a location fingerprint depicting a plurality of location data points that the information handling system was/is physically present at relative to at least one of the access points 138-1, 138-2, 138-N. These location data points may be used via a machine learning process to create clustering data that better defines the metes and bounds of any room within the building and defining the barriers present between the rooms (i.e., between the access points and the information handling system 100). In an embodiment, the time of flight module 132 may measure the TOF using the 802.11mc protocol which is the Wi-Fi® Round-trip-Time (Wi-Fi RTT) protocol used to measure the distance to nearby Wi-Fi® access points 138-1, 138-2, 138-N and used to determine an location of the information handling system 100 within 1-2 meters.

In an embodiment, the information handling system 100 may include a comparison module 136. The comparison module 136 may compare the data received by the RSSI module 134 and the data received by the time of flight module 132 to detect a reduction in power of the signal strength (resulting from the RSSI passing through a structure) relative to the time the signal took to be received by either or both of the information handling system 100 or network interface device 120/RSSI module 134. The reduction in RSSI relative to the time of flight (TOF) data may indicate an barrier or object such as a wall is present between any of the access points 138-1, 138-2, 138-N and any information handling system 100 within the network operating the systems and methods described herein.

During operation of the information handling system 100, the barrier through which the signal is passed may any type of object that is one of a permanently fixed object in a room (i.e., wall, ceiling, floor, door, etc.) or an object that is temporarily placed between the information handling system 100 and any of the access points 138-1, 138-2, 138-N (i.e., a chair, an open or closed door, a person, furniture, etc.). In an example, the RSSI module 134 may receive the signal strength data from the network interface device 120 and determine, based on any reduction in power of the signal, the relative thickness of the object placed between the information handling system 100 and any of the access points 138-1, 138-2, 138-N. Thus, in this embodiment, the reduction in the signal strength may be proportional to the distance the signal is passed through any given object. In an embodiment, the RSSI module 134 may compare the RSSI to the TOF signal received from any of the access points 138-1, 138-2, 138-N at the information handling system in order to determine whether a reduction in power of the RSSI exceeds a threshold reduction value. This threshold reduction value may be set to any sensitivity level that represents a reduction in power of the RSSI the RSSI module 134 is capable of detecting. In an embodiment, the RSSI module 134 may set the threshold reduction value between 6 and 10 decibels (dB). As described herein, the RSSI module 134 may detect the RSSI and the comparison module 136 may compare the RSSI value to the TOF value at any time and any number of times over a given period of time. Thus, this comparison may be conducted iteratively for any number of times based on instructions provided by, for example, a network administrator providing settings indicating when and how often to conduct the comparison. In a specific example, a motion sensor within the information handling system 100 may detect motion of the information handling system 100 and initiate the methods described herein to detect the RSSI and TOF values in order to create a new location fingerprint related to the position of the information handling system 100 within a room relative to any of the access points 138-1, 138-2, 138-N communicatively coupled to the wireless network and wirelessly detectable by the information handling system 100. As descried herein, these location fingerprints and their respective location data points may be clustered together to create the architectural plan by comparing the RSSI and TOF data between the information handling system 100 and any individual access point 138-1, 138-2, 138-N. This comparison may indicate, for example, that there is no drop in RSSI relative to the TOF with respect to a first access point whereas there is a drop in RSSI relative to the TOF with respect to a second access point. Thus, these location data points may be stored and used to create clustered data that describes the metes and bounds of any room the information handling system 100 is placed within.

Further, in an embodiment, the RSSI module 134 may continually receive signal strength data from any of the access points 138-1, 138-2, 138-N and determine, based on historic signal strength data (i.e., data maintained on the computer readable medium 122), whether that object is a permanent object or whether the object is a temporary object. In the embodiment where the object placed between the information handling system 100 and any of the given access points 138-1, 138-2, 138-N is a permanent object, the RSSI module 134 may indicate to the processor 102 that that that object is consistently contributing to a reduction in power over a threshold number of sets of signal strength data. This threshold number of sets of signal strength data may be set by a network or system administrator and may be based on the number of times an RSSI module 134 causes a signal to be sent from and/or received by the RSSI module 134 over a given period of time from that fingerprint location. In the embodiment where the object placed between the information handling system 100 and any of the access points 138-1, 138-2, 138-N is a temporary object the RSSI module 134 may indicate to the processor 102 that that object not normally there. The RSSI module 134 may then determine whether the object will contribute to a reduction in power of the signal strength over a threshold number of sets of signal strength data.

In an embodiment, the information handling system 100 or any other networked device may include a clustering module. In an embodiment, the clustering module may receive all RSSI and TOF data from related to all of the access points 138-1, 138-2, 138-N and/or other information handling systems 100 present within the network. In another embodiment, the clustering module may receive all RSSI and TOF data accrued between the specific information handling system 100 and all access points 138-1, 138-2, 138-N the information handling system 100 has communicated with within the wireless network. This clustering module may use an unsupervised clustering process to create determined location data associated with the networked devices (i.e., access points 138-1, 138-2, 138-N and information handling system 100) having associated media access control (MAC) address or other identification information to determine the metes and bounds of the architectural layout of a building by defining walls and rooms of the building (i.e., defining physical boundaries around the information handling systems and/or access points). In an embodiment, this may be accomplished by first triangulating the locations of the information handling systems 100 relative to the access points 138-1, 138-2, 138-N associated with the MAC address. In a specific embodiment, the triangulation process may be accomplished through determining relative distances between an information handling system 100 and a plurality of access points 138-1, 138-2, 138-N creating a location fingerprint with respect to the MAC address associated with any access points 138-1, 138-2, 138-N or any other data identifying the access points 138-1, 138-2, 138-N. Distances may be determined through the use of the TOF data received by the information handling system 100 and, specifically, the network interface device 120. Because the signals are propagated at the speed of light, this constant value may be used on connection with a time stamp to determine the distance between the information handling system 100 and the plurality of the access points 138-1, 138-2, 138-N. In an embodiment, the information handling system may detect the presence of a plurality of access points 138-1, 138-2, 138-N and identify those access points 138-1, 138-2, 138-N by their respective MAC addresses. In this embodiment, any given access point 138-1, 138-2, 138-N may have a respective TOF value and corresponding RSSI value associated with it. Because these TOF and RSSI values are unlikely to be repeated among the access point 138-1, 138-2, 138-N and information handling system 100 pairs, these unique set of TOF and RSSI values relative to the access points 138-1, 138-2, 138-N MAC addresses may be used as an address-identified fingerprint assigned by the information handling system 100 to each of the access points 138-1, 138-2, 138-N. Consequently, the TOF and RSSI values described herein may be used by the information handling system 100 to determine the relative locations of the information handling systems 100 relative to the access points 138-1, 138-2, 138-N without additional location data such as GPS or architectural-based location data.

In an embodiment, the information handling system 100 may also detect whether the physical location of any of the access points 138-1, 138-2, 138-N has been changed, whether any of the access points 138-1, 138-2, 138-N has been removed from the wireless network, and/or whether any additional or new access points 138-1, 138-2, 138-N have been communicatively coupled to the wireless network. This is because the RSSI and TOF values associated with any MAC address of any of the access points 138-1, 138-2, 138-N changes, is no longer detectable by the information handling system, or includes a new set of RSSI and TOF values not detected before (respectively). Thus, in this embodiment, any adjustment to the access points 138-1, 138-2, 138-N within the wireless network may be detected by the information handling system and accounted for when the information handling system 100 is developing the architectural layout of the building using the clustering process described herein.

When multiple distances are determined between the information handling system 100 and the plurality of access points 138-1, 138-2, 138-N, a location of the information handling system 100 may be determined. As such, a location fingerprint may be created that associates the MAC address of each access points 138-1, 138-2, 138-N with any RSSI/TOF data pairs. A corresponding location fingerprint may be created the information handling system 100 for each information handling system 100 and access point 138-1, 138-2, 138-N pair, thereby allowing the comparison module 136 of the information handling system 100 to compare the RSSI/TOF pairs from each access point 138-1, 138-2, 138-N and cluster the location fingerprints based on similarities or dissimilarities between the location fingerprints. Indeed, for each access point 138-1, 138-2, 138-N communicatively accessible by the information handling system 100, the information handling system may associate an identification (i.e., a MAC address) of that access point 138-1, 138-2, 138-N with RSSI and TOF data. The information handling system 100 may have a number of RSSI and TOF data sets associated with any given access point 138-1, 138-2, 138-N when the information handling system 100 is physically moved throughout the architectural layout of the building in which the wireless network is deployed.

The clustering module may then cross-reference the comparison data from the comparison module 136 with the clustering module determining the walls and rooms within a building as well as where any individual information handling system 100 is located at any given time. Because the processes described herein may be implemented continuously, the clustering module may learn the architectural layout of the building even if the layout changes via architectural improvements/changes made to the building infrastructure itself when the location of the information handling system 100 within the building changes or when access point may be moved within, added to, or removed from the wireless network. Still further, the individual determined locations of the information handling systems 100 may be clustered together using the clustering module to better define potential locations within a room the information handling system 100 or any information handling system 100 may be located. This clustering data may be used to define where permanent physical barriers (i.e., walls, floors, ceilings) are located. Thus, without actual data provided to the information handling system 100 regarding the physical layout of a building, the present system and methods described herein may discover an architectural layout of rooms within a building.

In an embodiment, the presently described systems and methods allow settings relative to each information handling system 100 to be changed/maintained based on the location fingerprint of the information handling system 100 within the architectural layout defined by the information handling system 100. For example, settings associated with any of the information handling systems 100 may be changed as any of the information handling systems 100 change from physical location to physical location (i.e., from room to room) within the building. During operation, the information handling system 100 may receive settings data descriptive of how the settings associated with the information handling systems 100 are to be set based on the detected location/room within the discovered architectural layout of the building. These sets of settings data may be referred herein as a setting profile. As a consequence, the setting profile of any given information handling system 100 may be changed based upon a detection that the information handling system 100 has moved from one room to another thereby increasing the functionality of the information handling system 100 and increasing the usability of the information handling system 100. Example settings may include audio settings, video settings, application permission settings, server access permission settings, and user interface settings, among other settings.

In certain embodiments, the present information handling system 100 may detect the layout of an entire building regardless of the number of floors within the building by detecting walls, ceilings, floors. As described herein, the density of the materials that form the floors, walls, and/or ceilings may vary the magnitude of the degradation in the RSSI as a signal passes through each of these types of materials. In this embodiment, the RSSI module 134 may receive the signal strength data from the network interface device 120 and, based on the decrease in strength of the power of the signal, may determine whether the object between the information handling system 100 and any of the access points 138-1, 138-2, 138-N is one of a wall, a ceiling, or a floor. Based on this data, the RSSI module 134 may indicate that any given access point 138-1, 138-2, 138-N relative to the information handling system 100 is either on a floor above the information handling system 100, on a floor below the information handling system 100, or on the same floor as the information handling system 100. Thus, the RSSI module 134 and the information handling system 100 may form an architectural plan of a building that is not only a two-dimensional layout (i.e., a single floor of a building) but also a three-dimensional layout (i.e., multiple floors of a building).

In some embodiments, the information handling system 100 may be any type of computing device communicatively coupled, either via wire or wirelessly, to any number of devices within a network. In an example, the information handling system 100 is a computing device that includes a processor 102, a main memory device 104, static memory device 106, video display 110, input device 112, keyboard 114, drive unit 116, time of flight module 132, RSSI module 134, and comparison module 136. In an embodiment, the information handling system 100 shown in FIG. 1 may by one of many different and distinct information handling systems 100 communicatively coupled within the network to perform the processes and methods described herein. In a specific embodiment, each of the communicatively coupled information handling systems 100 may share data descriptive of power reductions in a signal from the access points 138-1, 138-2, 138-N detected by the RSSI module 134 over the network. This may increase the ability of the information handling system 100 to quickly and more accurately define a layout of a number of rooms or objects located within an architectural space.

By implementation of the information handling system 100 described herein, various information handling systems 100 may be used in concert with each other to form an architectural plan of a building without specific data being provided to any networked device regarding the architectural plan. Indeed, by performing this unsupervised machine learning approach, any RSSI data and TOF data may be correlated to define the metes and bounds of physical barriers placed between any given information handling system 100 and any given access point 138-1, 138-2, 138-N. Because the processes and methods of comparing the RSSI data and the TOF data using the comparison module 136 is completed any number of times, dynamic or non-permanent structures (i.e., furniture, people, doors, etc.) may be accounted for and the architectural plan of the building may be continually updated as non-permanent object are moved throughout the building. Additionally, because the network is placed within the building during initial operation of the network, the processes and methods performed by the information handling system 100 and information handling systems 100 may be initiated immediately upon deployment thereby allowing the process of machine learning to proceed immediately upon deployment resulting in a concurrent description of the architectural plan within the building the network and its networked devices are deployed. Further, user satisfaction may be increased by allowing for certain settings profiles to be initiated on the information handling system 100 based on the room the information handling system 100 is detected to be within. These settings may include any setting associated with the information handling system 100 such as, but not limited to, display settings, video settings, audio settings, power settings, lighting settings, network settings, among others. Further, indoor navigation may be facilitated at the information handling system 100 after the machine learning process has identified the rooms defining the floor plan of the building. This navigation may allow a user, via turn-by-turn directions or otherwise, how to reach a certain room within the floor plan identified by the machine learning processes described herein.

Additionally, because, in an embodiment, the time of flight module 132, RSSI module 134, and comparison module 136 may be implemented as computer readable program code executed by the processor 102, additional physical changes to the information handling system 100 itself may not be implemented so as to allow for the execution of the processes and methods described herein. Consequently, in this embodiment, the costs associated with the implementation of the processes and methods described herein may be reduced.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 of the information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
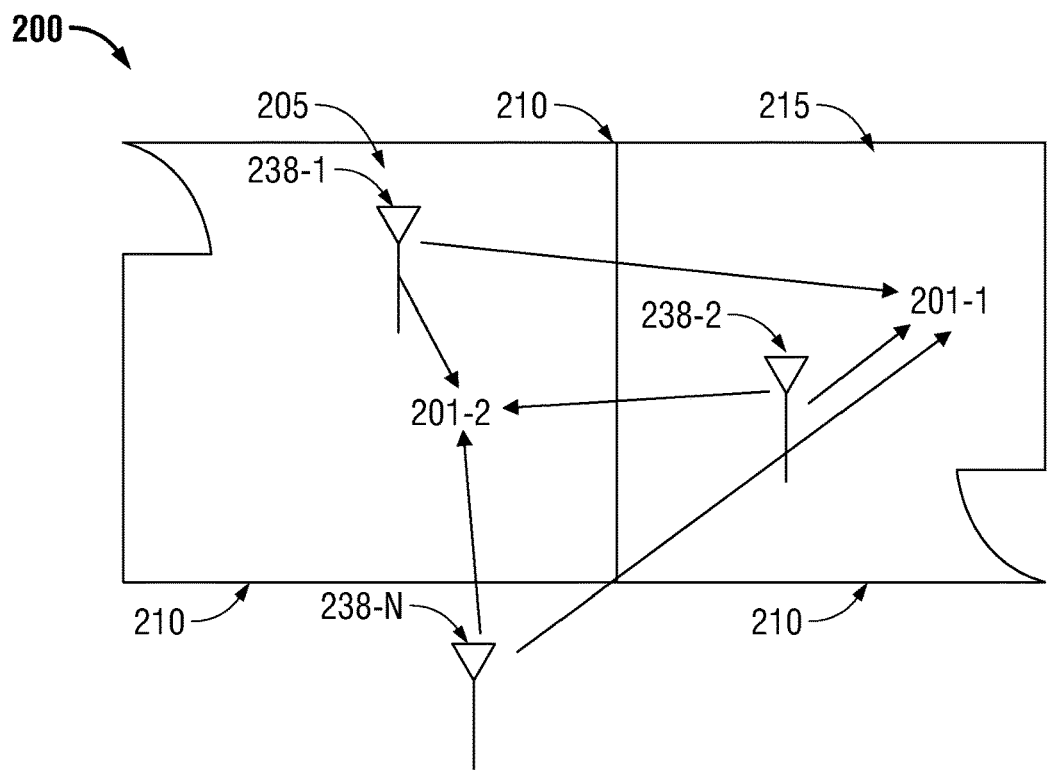
FIG. 2 is a block diagram of an architectural layout of two rooms on a floor having plural access points within range according to an embodiment of the present disclosure.

FIG. 2 is a block diagram of an architectural layout 200 of two rooms 205, 215 on a floor having plural access points within range according to an embodiment of the present disclosure. The architectural layout 200 shown in FIG. 2 shows a first room 205 and a second room 215. Although FIG. 2 shows the two rooms 205, 215, the present disclosure contemplates the use of the systems and methods in connection with any number of rooms within any number of floors of a building. Thus, the present specification contemplates that the present method and systems may detect any number of walls, floor, ceilings, or other permanent and/or temporary fixtures in a building. Still further, the present disclosure contemplates that the physical footprint discoverable by system and method may be dynamically increased/decreased to fit any discovery of any room within a building. In an example, the increase/decrease of the physical footprint of the discoverable locations within a building may be accomplished by communicatively coupling any number of additional information handling systems 201-1, 201-2 and/or access points 238-1, 238-2, 238-3 to a common network. By way of example, new or additional rooms may be rendered discoverable through the system and methods described herein, by communicatively coupling an information handling system 201-1, 201-2 to the network so that that specific information handling system 201-1, 201-2 may be used to define the metes and bounds of a room the information handling systems 201-1, 201-2 is placed within. Thus, as the number of access points 238-1, 238-2, 238-3 and/or information handling systems 201-1, 201-2 is increased, the discovered architectural changes and/or architectural details of any given building may be increased as well.

In the embodiment presented in FIG. 2, three access points 238-1, 238-2, 238-3 have been deployed in and out of two individual rooms 205, 215. These access points 238-1, 238-2, 238-3 may be communicatively coupled to a network of devices such as each other as well as any number of information handling systems 201-1, 201-2. In an embodiment, the access points 238-1, 238-2, 238-3 may be a wireless access point (WAP) or other networking hardware devices that allow other Wi-Fi® or networked devices to connect to a wired network. Thus, in an example, the access points 238-1, 238-2, 238-3 may be communicatively coupled to the network via a physical, wired connection such as an Ethernet® cable or via a wireless connection such as Wi-Fi® connection, a Bluetooth® connection, and a near-field communication (NFC) connection, among other types of wireless connections. FIG. 2 also shows two information handling systems 201-1, 201-2 communicatively coupled to any/all of the access points 238-1, 238-2, 238-3. Again, the information handling systems 201-1, 201-2 may be communicatively coupled to the network on which the access points 238-1, 238-2, 238-3 are also connected. Each of the information handling systems 201-1, 201-2 may be communicatively coupled to the network via a wired or wireless connection as described herein. Thus, via the network connections, each of the information handling systems 201-1, 201-2 may be able to communicatively couple to each/all of the access points 238-1, 238-2, 238-3 in order to complete the methods described herein. In an embodiment, the communicative coupling of the information handling systems 201-1, 201-2 to any/all of the access points 238-1, 238-2, 238-3 allows for the position of each of the information handling systems 201-1, 201-2 to be known. In a specific embodiment, the RSSI and/or TOF values sent to and/or received from each of the access points 238-1, 238-2, 238-3 may be used to triangulate a position of each of the information handling systems 201-1, 201-2 relative, at least, to each of the access points 238-1, 238-2, 238-3. Thus, in this embodiment, two access points 238-1, 238-2, 238-3 may be used to triangulate the position of a single information handling system 201-1, 201-2.

Upon determining the location of at least one of the information handling systems 201-1, 201-2 relative to a plurality of access points 238-1, 238-2, 238-3, the systems and methods may detect an RSSI between each of the information handling systems 201-1, 201-2 and a or a plurality of access points 238-1, 238-2, 238-3. As described herein, when the access points 238-1, 238-2, 238-3 are each within a "line-of-sight" of the information handling system 201-1, 201-2, a power value associated with an RSSI may not perceptibly decrease indicating that there is no object between the access points 238-1, 238-2, 238-3 and the information handling system 201-1, 201-2. The term "line-of-sight" as used in the present description is meant to be understood as a path between an information handling system 201-1, 201-2 and an access point 238-1, 238-2, 238-3 with no object therebetween. Additionally, when the access points 238-1, 238-2, 238-3 are located in a room separate from any information handling system 201-1, 201-2, a physical barrier such as wall 210 may disrupt the wireless signals sent between the information handling system 201-1, 201-2 and access points 238-1, 238-2, 238-3. Thus, the information handling system 201-1, 201-2 may detect a reduction in power related to the RSSI from any access point 238-1, 238-2, 238-3 or may be so notified by an access point 238-1, 238-2, 238-3 that the RSSI has demonstrated a reduction in power. In either of these embodiments, a reduction in power of the RSSI may indicate that the wall 210 physically separates, for example, a first access point 238-1 and a first information handling system 201-1; a second access point 238-2 and a second information handling system 201-2; and/or a third access point 238-N and either or both of the first information handling system 201-1 and second information handling system 201-2.

As described herein, the reduction in power detected by any of the information handling systems 201-1, 201-2 may be sufficient to meet or exceed a threshold power reduction level. The value associated with this threshold power reduction level may be dependent on a number of factors including, but not limited to, the distance between any given access point 238-1, 238-2, 238-3 and any given information handling system 201-1, 201-2, a sensitivity of a network interface device and/or a RSSI module within an information handling system 201-1, 201-2, and the thickness of an object (i.e., wall 210) placed between any given access point 238-1, 238-2, 238-3 and information handling system 201-1, 201-2, among other factors. In an embodiment the threshold power reduction level may be set to between 6 and 10 decibels.

During operation, comparison module associated with any of the information handling systems 201-1, 201-2 may receive a signal from any of the access points 238-1, 238-2, 238-3 and compare an RSSI of that signal with a TOF value. In an example, a reduction in power of the RSSI with a reasonably lower reduction in TOF may indicate that an object such as a wall 210 is between any given access point 238-1, 238-2, 238-3 and any given information handling system 201-1, 201-2. This reduction in power may be qualitatively defined by, for example, a time of flight module, a RSSI module, and/or a comparison module to determine whether the reduction in power of the RSSI or an extension in the TOF is insignificant, substantial, or should be further analyzed. In the embodiment where the reduction of power of the RSSI or an extension in the TOF is insignificant, the information handling system 201-1, 201-2 detecting an object between the access points 238-1, 238-2, 238-3 and the information handling system 201-1, 201-2 may conclude that there is no object between the information handling system 201-1, 201-2 and the access points 238-1, 238-2, 238-3. In the embodiment where the reduction of power of the RSSI or an extension in the TOF is significant, the information handling system 201-1, 201-2 detecting an object between the access points 238-1, 238-2, 238-3 and the information handling system 201-1, 201-2 may conclude that there is an object (i.e., a wall 210) between the information handling system 201-1, 201-2 and the access points 238-1, 238-2, 238-3. In the embodiment where the reduction of power of the RSSI or an extension in the TOF is insignificant, the information handling system 201-1, 201-2 detecting an object between the access points 238-1, 238-2, 238-3 and the information handling system 201-1, 201-2 may conclude that further analysis should be conducted, the information handling system 201-1, 201-2 may further conduct an analysis of that RSSI and/or TOF data. In this embodiment, the further analysis may access a look-up table indicative of whether the reduction of power in the RSSI, the extension in the TOF, or a comparison of the RSSI to the TOF values is indicative of an object between the information handling system 201-1, 201-2 and any given access point 238-1, 238-2, 238-3. In this embodiment, the look-up table may provide data sufficient to detect the thickness of the object placed between the information handling system 201-1, 201-2 and any given access point 238-1, 238-2, 238-3 so as to allow the comparison module to determine what type of object is placed between the information handling system 201-1, 201-2 and any given access point 238-1, 238-2, 238-3: a drywall wall 210, a concrete wall, a concrete floor, and a wood ceiling, among others. Consequently, not only may the comparison module of an information handling system 201-1, 201-2 determine that an object is present between the information handling system 201-1, 201-2 and any given access point 238-1, 238-2, 238-3, the comparison module may further provide additional data as to specific characteristics of that object and draw conclusions based on those characteristics as to what that object is.

As described herein, the comparison module may conduct or cause a processor to conduct the receipt of a signal from an access point 238-1, 238-2, 238-3 by an information handling system 201-1, 201-2 for the purpose of comparing the RSSI to the TOF values received there. Again, this process may be conductive in an interactive fashion so as to determine whether the objects detected by the comparison module and the process described herein are still present where expected. Thus, the comparison module of the information handling systems 201-1, 201-2 may determine whether any given object is a permanent or temporary object that may or may not be moved. Consequently, the systems and methods described herein may be capable of determining whether the object is a permanent wall 210 or, for example, a door that may or may not be present at times between the information handling system 201-1, 201-2 and any given access point 238-1, 238-2, 238-3 based on the presence of the object over a plurality of iterations of the processes described herein.

Figure 3:
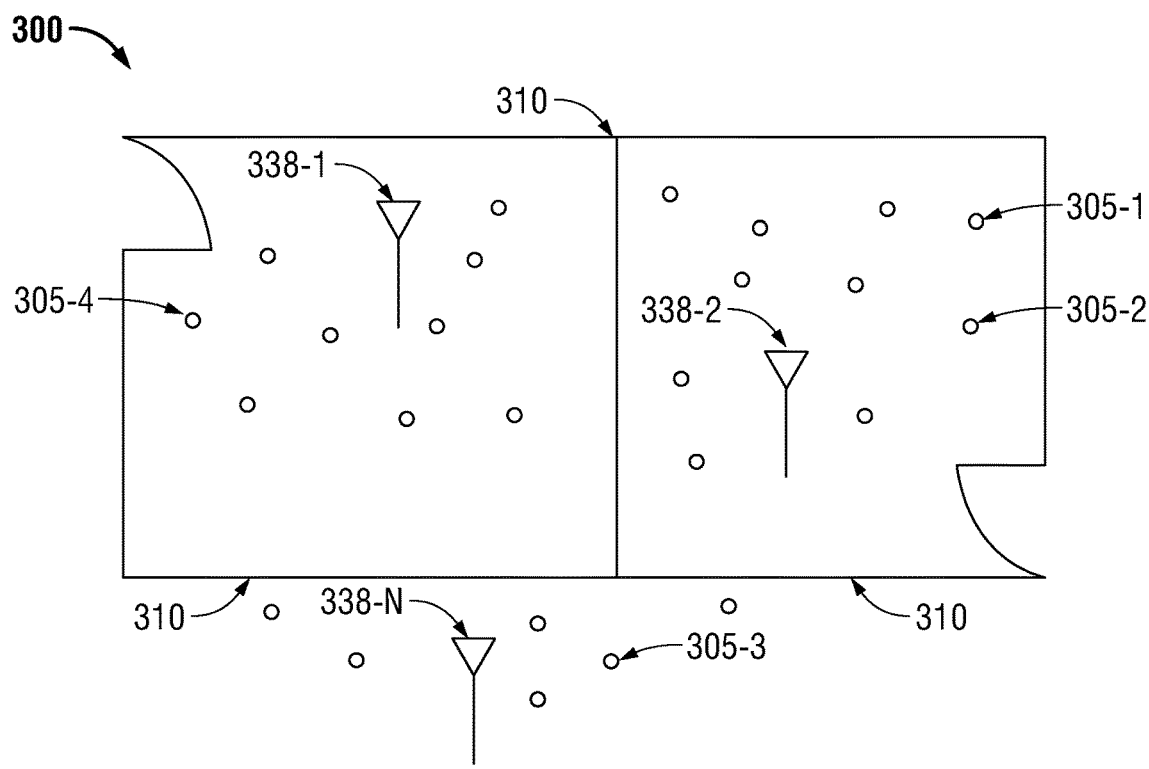
FIG. 3 is a block diagram of an architectural layout of two rooms on a floor having plural access points within range according to another embodiment of the present disclosure.

As described herein, the positional data and associated RSSI and TOF data associated with any of the given information handling systems 201-1, 201-2 may be used in a clustering process to further define, on a two-dimensional scale, the metes and bounds of any given room 205, 215. FIG. 3 is a block diagram of an architectural layout of two rooms on a floor having plural access points within range according to another embodiment of the present disclosure. Again, FIG. 3 depicts a plurality of rooms into which have been placed a plurality of access points 338-1, 338-2, 338-N. Similar to FIG. 2, the access points 338-1, 338-2, 338-N may have a number of walls 310 or other objects placed between each other as well as between the access points 338-1, 338-2, 338-N and information handling systems. The process and methods described herein may be used to learn location fingerprints of each information handling system relative to the access points 338-1, 338-2, 338-N. FIG. 3 also shows a plurality of location data points 305-1, 305-2, 305-3, 305-4 of an information handling system that are labeled and unlabeled. In this embodiment, each of the location data points 305-1, 305-2, 305-3, 305-4 represent visually a location within the physical space of any of the given rooms where an information handling system was/is located. Because the process of detecting an object between the access points 338-1, 338-2, 338-N and the information handling system may be conducted iteratively, each information handling system may learn not only that an object is present between the access points 338-1, 338-2, 338-N and the information handling system, but may also learn the metes and bounds of those objects through a clustering process. This clustering process may accumulate a number of sets of location data (i.e., the location data points 305-1, 305-2, 305-3, 305-4 at any given time) and RSSI data and TOF data descriptive of whether an object is between the information handling system and the access points 338-1, 338-2, 338-N at any given location within the architectural layout of the building.

With this data, the location data points 305-1, 305-2, 305-3, 305-4 and the location fingerprints associated with the location data points 305-1, 305-2, 305-3, 305-4 may provide a length, height, and/or width of an object placed between the information handling system and the access points 338-1, 338-2, 338-N. By way of example, when the information handling system is moved from location to location within a given room, a location data point may be recorded: the location data point creating a location fingerprint describing the RSSI/TOF data, and MAC address of the access points, and/or clustering data received by other information handling systems, among other data. Where the RSSI/TOF data consistently indicates that an object is present between the information handling system and the access points 338-1, 338-2, 338-N within a clustered area of location data points, this may indicate the dimensions of the wall or object resulting in a conclusion as to whether the object is a wall, a door, or any other temporary object located by the information handling system. In a specific embodiment, the clustering of the location data points 305-1, 305-2, 305-3, 305-4 in order to define the metes and bounds of an object relative to the information handling system may be conducted as a machine learning technique implementing a clustering method that learns the metes and bounds of a room or a plurality of rooms as the information handling system is moved within an architectural space. A clustering method may include any supervised or unsupervised learning process such as a hierarchical cluster process, a k-means process, a mixture models process, a density-based spatial clustering of application with noise (DBSCAN) process, and an ordering points to identify the clustering structure (OPTICS) process, among other processes. In any embodiment, as the number of location data points 305-1, 305-2, 305-3, 305-4 increases (number of recorded location data and RSSI/TOF data of an information handling system), the machine learning processing may increase the accuracy and precision of mapping the architectural layout of the building in which the network is deployed. In an embodiment, all location fingerprint data accumulated and associated with all of the access points and/or information handling systems within the wireless network may be shared among all the access points and/or information handling systems so as to exponentially increase the location data points available to any given information handling system.

As described herein, by learning, via the machine learning processes described herein, the metes and bounds of each room within an architectural layout of a building, each of the information handling systems may implement specific settings profiles associated with it. In this embodiment, the settings profile associated with any given information handling system may provide input to a processor as to how the settings are to be set based on a detected location of the information handling system within the architectural layout of the building. By way of example, the settings profile may set a volume level, a microphone sensitivity, a display brightness, a webcam setting, and a keyboard lamination setting, among other settings. Each of these settings may be preconfigured and executed upon detection of the information handling system within a specifically defined room in the architectural layout discovered using the processes described herein.

Figure 4:
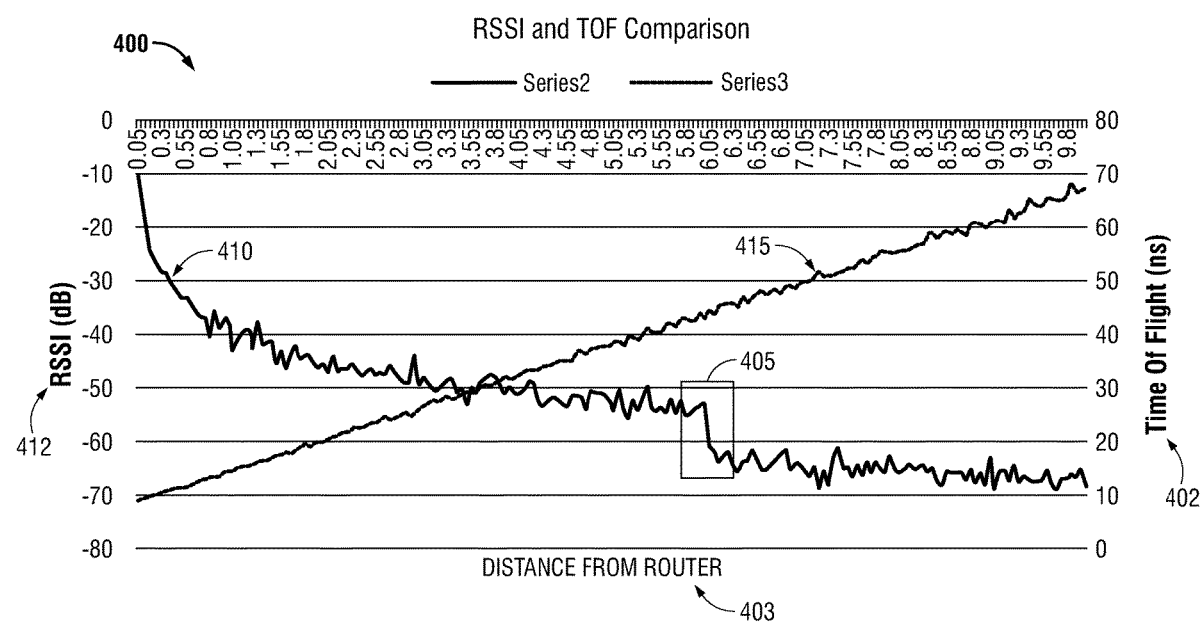
FIG. 4 is a graph showing value of received signal strength indicator (RSSI) versus a time of flight (TOF) according to an embodiment of the present disclosure.

FIG. 4 is a graph 400 showing value of RSSI 410 versus a TOF 415 according to an embodiment of the present disclosure. The graph 400 shows a RSSI 410 representative of a signal sent or received by either of the access points or information handling systems over time. As FIG. 4 shows, the RSSI signal strength 412 (measured in decibels (dB)) degrades over time/distance 402/403 and this degradation may be predictable based on the distance of, for example, the information handling system from any one of the access points.

FIG. 4 also shows a TOF line 415 indicative of the time 402 a signal reaches its destination over a distance 403. By way of example, a signal from an access point may be sent to an information handling system along with a timestamp. The time stamp may be accurate enough to provide a TOF value on the order of nanoseconds (ns). Thus, in this example, the access point may provide not only a signal to the information handling system but also provide a timestamp the signal was sent so that the information handling system may compare the timestamp received from the access point with a timestamp the information handling system received the signal. Again, the accuracy of this comparison may be dependent on the precision of the network interface device of the information handling system but may be sufficient to determine the time 402 the signal took to traverse the distance 403 from the access point to the information handling system on the scale of nanoseconds.

FIG. 4 also shows a highlighted area 405 along the RSSI line 410. This specific highlighted area 405 shows a reduction in power (dB) of the RSSI value at a distance from the access point. In this example, this reduction is detected at 5.8 to 6.3 meters from the source of the signal (i.e., an access point). This reduction in power at 405, per FIG. 4, is around 52 to 65 dB. As compared to the rest of the RSSI line 410, this reduction may indicate an object is present between the source of the signal (i.e., the access point) and the destination of the signal (i.e., the information handling system). This RSSI data may be used by the system executing the methods and processes as described herein. Specifically, the reduction in the RSSI value at 405 as compared to the consistent TOF value (i.e., signal strength over time) 415 may be used to map a wall or other object within the architectural layout of a building.

Again, the amount of reduction in the RSSI value over time may indicate the type of object that is between the access point and the information handling system. In an example, the reduction of 10 dB in power associated with the RSSI may indicate a specific type of object between the access point and the information handling system such as a wall. Other relatively more significant reductions in power greater than 10 dB may indicate that the thickness of the object is more significant than that of a regular wall or that the object is made of a material that is relatively denser than a wall. In turn, a comparison module may conclude that that the object is, for example, a concrete wall, a concrete floor, a steel wall, a steel floor, or any other thicker/denser object than what may have been determined to be a wall made of drywall/wood. Similarly, a reduction power of the RSSI less than 10 dB may either not be detectable by a comparison module or may indicate that the object is something other than a wall. In this example, the comparison module may continue to monitor the RSSI data/TOF data to determine if this particular object is a temporary object or not. Whether the object is a temporary or permanent object may indicate to the comparison module that the object is, for example, a door, a piece of furniture or any other non-permanent object. Thus, over time, the machine learning processes described herein may not only provide an architectural layout of a building, but may also indicate the presence of moveable objects within any given room and specific characteristics of those objects that can lead to a determination of what those objects are based on the level of reduction of power of the RSSI. This reduction in power data may be saved on, for example, a data storage device on any of the information handling systems and/or access points on a look-up table. This look-up table may reference both historical data accumulated by the systems described herein as well as data, provided by a manufacturer, indicative of what objects would create specific levels of reduction of power in the RSSI. These manufacturer-provided data sets may provide ranges of anticipated reductions in power associated with specific objects or types of materials that would manifest such reductions in power in the RSSI 410 value such as that shown in FIG. 4.

Figure 5:
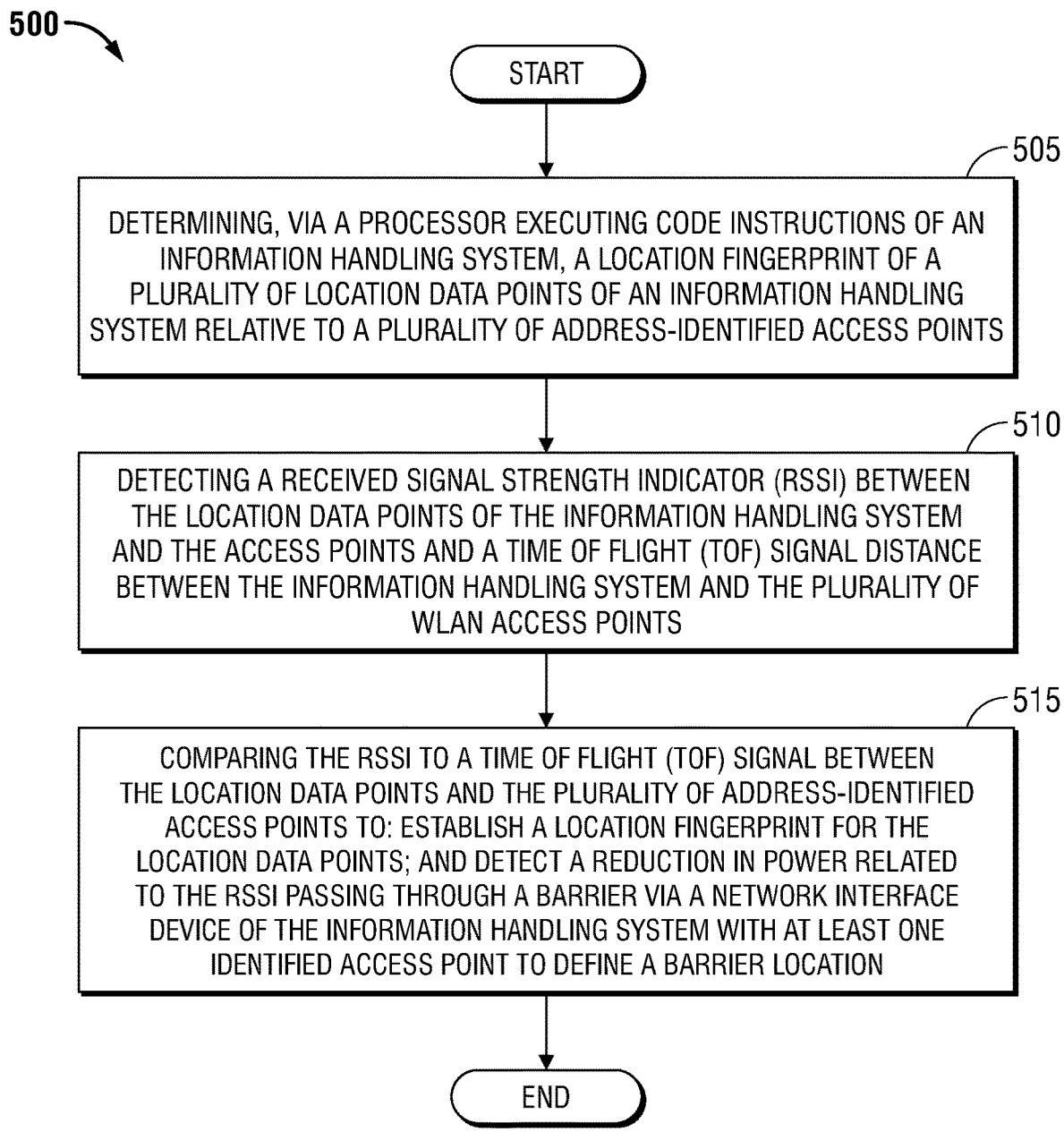
FIG. 5 is a flow diagram illustrating a method of creating a profile of a room according to an embodiment of the present disclosure.

FIG. 5 is a flow diagram illustrating a method 500 of creating a profile of a room according to an embodiment of the present disclosure. The method 500 may being with, at block 505, determining, via a processor executing code instructions of an information handling system, a location fingerprint of a plurality of location data points of an information handling system relative to a plurality of address-identified access points. The present method 500 contemplates that the location of any number of address-identified access points may be determined via, for example, a triangulation process. In this embodiment, a location of any single access point may be determined relative to a plurality of access points by receiving, at the information handling system, a signal from the plurality of access points. These signals from each of the plurality of access points may include a time stamp indicative of when the signal was sent. This process may include comparing the timestamp of the signals from each the plurality of access points to the time the signal is received by the information handling system from each of those access points to calculate a time difference and associate the same with a MAC address of the access points and/or other information handling systems coupled to the network and their respective identifiers. This process may continue with comparing the time differences calculated from each access point and triangulating the position of the information handling system accordingly. Although, the present description provides a description of a specific process used to determine (at block 505) a location of any given access point relative to a plurality of access points and/or information handling systems, the present specification contemplates that other methods may be used. These other methods may include the receipt of data indicative of the position of the access points at the information handling system without relying on the information handling system to triangulate its location.

The method 500 may continue detecting a RSSI between the location data points of the information handling system and the address-identified access points and a time of flight (TOF) signal distance between the information handling system and the plurality of WLAN access points at block 510. As described herein, in order to determine whether an object such as a wall is between the access points and any given information handling system, the RSSI may be evaluated. Again, a reduction in power (dB) as indicated in the example graph shown in FIG. 4 may indicate that an object such as a wall is present between any given access point and an information handling system.

The method 500 may then compare, at block 515, the RSSI to a TOF signal between the location data points (i.e., physical locations of the information handling system at any given time) and the one or more address-identified access points so as to establish a location fingerprint for the location data points; and detect a reduction in power related to the RSSI passing through a barrier via a network interface device of the information handling system with at least one identified access point to define a barrier location. The comparison at block 515 may implement that data as, for example, represented in FIG. 4 that compares the RSSI value at any given distance between any given information handling system and access point relative to the TOF data acquired through the use of a timestamp carried by the signal.

As described herein, the entire method 500 described in connection with FIG. 5 may be conducted iteratively for a plurality of location data points so as to more accurately define the architectural layout of a building as well as determine whether any given object between each of the information handling systems and access points. Additionally, the iterations of the execution of the method 500 described here and in connection with FIG. 5 may be conducted as the information handling systems themselves are moved throughout the architecture of the building so as to implement a clustering process via clustering of the location data points as described herein. This clustering process may be done so as to better correlate the separations between rooms discovered in the method 500.

By way of example, a reduction in power of the RSSI relative to the TOF may indicate that an object exists between any given information handling system and access point. Still further, the amount of reduction in power of the RSSI may indicate what type or class of object is between any given information handling system and any given access point. As described herein, in some embodiments, the reduction of power of the RSSI relative to the TOF may be compared to data maintained in a look-up table. The data in the look-up table may allow the information handling systems to conclude what object or type of object is being detected based on the amount of reduction in power of the RSSI detected (i.e., at block 510). Thus, in some embodiments, the type of material of the object as well as conclusions of the object itself may be made based on reference to this look-up table.

Figure 6:
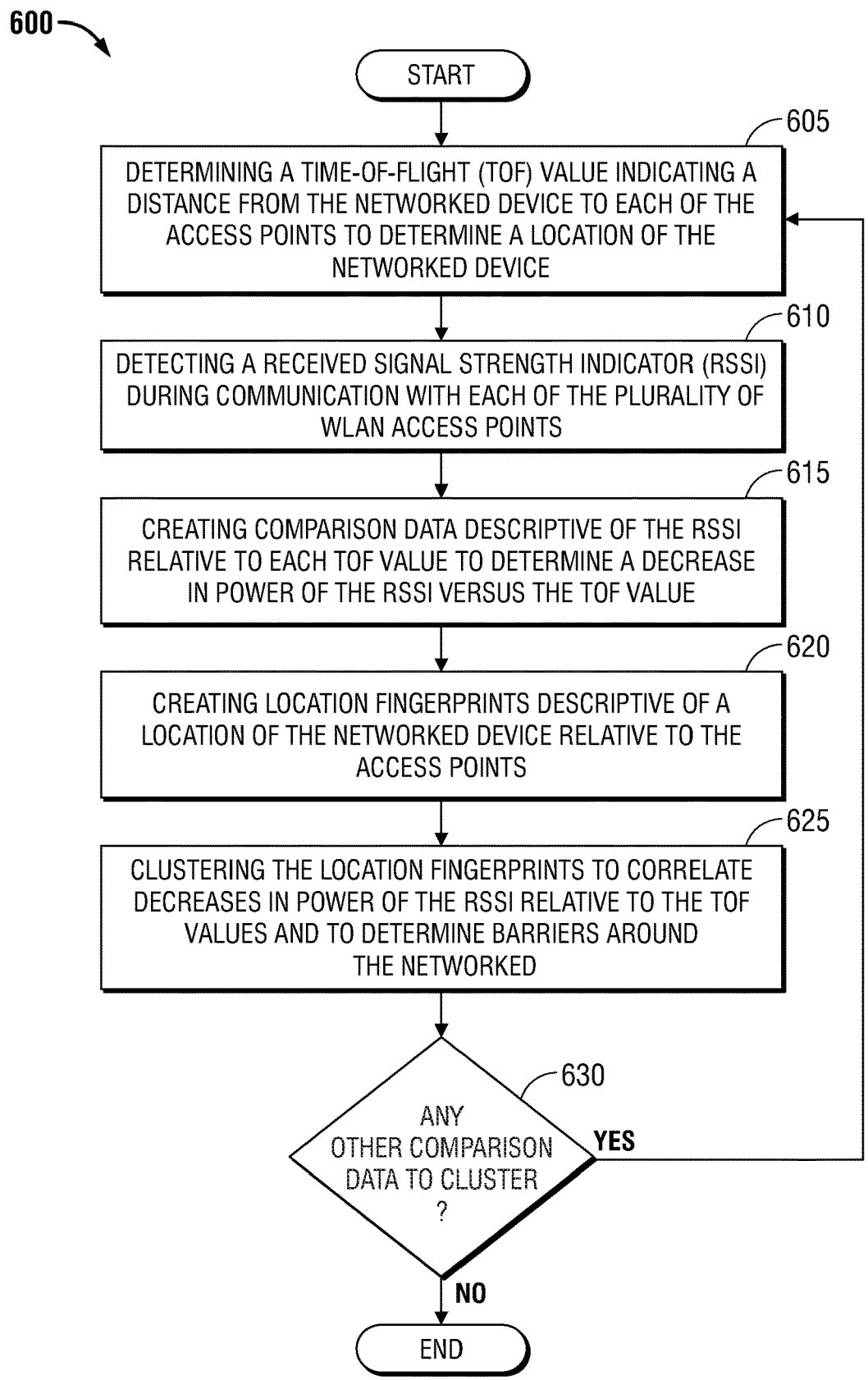
FIG. 6 is a flow diagram illustrating a method defining an architectural space into identifiable rooms according to an embodiment of the present disclosure.

FIG. 6 is a flow diagram illustrating a method 600 defining an architectural space into identifiable rooms according to an embodiment of the present disclosure. The method 600 is meant to be understood as being operated in a network with one of a plurality of networked devices being communicatively coupled together with the network including a plurality of address-identified access points. As described herein, the network may include, in a simplest form, two access points and a single information handling system. However, embodiments of the present description contemplate that the network may include more than two access points as well as any plurality of information handling systems.

In the embodiments described in connection with FIG. 6, the method 600 may begin with, at block 605, iteratively, determining a TOF value indicating a distance from the networked device to each of the access points to determine a location of the networked device. As described herein, a TOF measurement request may include a timestamp that indicates when the request was sent from the access points. This timestamp may be carried along with the request and received, in an embodiment, a network interface device of an information handling system as described herein.

The method 600 may continue with, at block 615, detecting an RSSI during communication with each of the plurality of WLAN access points by an information handling system. An example RSSI signal is represented in FIG. 4 and a similar data set represented in that figure may be used to complete the process described for another aspect of the location fingerprint at block 615. Specifically, the RSSI data received at block 615 may be used to create, at block 620, comparison data descriptive of the RSSI data relative to the TOF values for location fingerprints of locations relative to the address-identified access points. Thus, an area or floor may be identified with room and walls by determining a decrease in power of the RSSI versus the TOF value. This comparison may result in a determination as to whether an object is located between any given information handling system at a location relative to the plurality of access points and any address-identified access point within the network. As described herein, the reduction in power of the RSSI may not only detect the presence of an object but may also be used to determine the placement, type, and specific characteristics of the object so as to conclude the nature of the object itself.

The method 600 may also include clustering, at 620, creating location fingerprints descriptive of a location of the networked device. As described herein, the location fingerprints may associate the TOF/RSSI data and MAC addresses together so as to create location data points relative to the access points within the wireless network. The location data points may be created multiple times (i.e., via iteratively executing the method 600) and maintained on a data storage device for the information handling system.

The method 600 may continue at 625 by detecting a reduction in power related to the RSSI passing through a barrier via a network interface device of the information handling system with at least one identified access point to define a barrier location. In an example, the reduction in power related to the RSSI passing through a barrier may be done by correlating the decreases in power of the RSSI to the TOF value for several locations relative to one or more location. This clustering process may be conducted using any clustering technique whether unsupervised or supervised. Clustering at block 625 may specifically allow for further defining of an architectural space into identifiable rooms as well as further define the metes and bounds of each individual room relative to address-identified access points without the use of GPS data or other types of location systems as described herein. Indeed, a determination at block 630 may be made as to whether any other comparison data is to be included in a clustering at block 625. Whenever additional comparison data is to be included during the clustering process at block 625, the process may iteratively be conducted so as to include as many information handling systems into the clustering process as possible. Consequently, the process may be an iterative process that contemplates that other devices may be communicatively coupled to the network as the footprint of the network is increased.

The blocks of the flow diagrams of FIGS. 5 through 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of creating a profile of a room via a plurality of wireless local area network (WLAN) access points, comprising:

determining, via a processor executing code instructions of a client information handling system, a location fingerprint of a plurality of location data points including received signal strength indicator (RSSI) values and time of flight (TOF) values of the client information handling system at a location relative to a plurality of WLAN access points that are address-identified;

detecting, via a network interface device of the client information handling system, the RSSI values between the client information handling system and the WLAN access points and the TOF values indicating signal distance between the client information handling system and the plurality of WLAN access points; and comparing the RSSI values to the TOF values for the location data points among the plurality of WLAN access points to:

establish a location fingerprint of the client information handling system at the location having a plurality of RSSI values and TOF values from a plurality of the location data points; and detect a reduction in power related to the RSSI values of a first wireless signal passing through a barrier via the network interface device of the client information handling system with at least a first identified access point of the plurality of WLAN access points to define a barrier location relative to the location fingerprint for the location of the client information handling system.

2. The method of claim 1, further comprising:
maintaining, for each of the location fingerprint, data descriptive of each of the plurality of WLAN access points including
the RSSI value,
the TOF value, and
a media access control (MAC) address associated with each WLAN access point as location data points that comprise the location fingerprint for the location of the client information handling system.

3. The method of claim 1, wherein the plurality of WLAN access points include specific addresses uniquely identifying access points within a wireless range of the information handling system.

4. The method of claim 1, further comprising:
iteratively determining location fingerprints of the information handling system at a plurality of locations as the physical location of the information handling system changes.

5. The method of claim 1, further comprising:
clustering the determined location fingerprint having the plurality of location data points to define, using the comparisons between the individual RSSI and TOF signals at the location data points between the client information handling system and the plurality of WLAN access points, the barriers of a room the client information handling system resides within.

6. The method of claim 1, further comprising:
clustering, using an unsupervised clustering process, the plurality of location data points to define, using the comparisons between the individual RSSI and TOF signals at the location data points of the information handling system and the plurality of WLAN access points; and
defining physical barriers around the location data points for the location of the client information handling system and relative to the WLAN access points.

7. The method of claim 1, further comprising:
for each of the client information handling system and WLAN access point pair for the plurality of WLAN access points, determining the TOF by:

sending a request for time measurement from the information handling system to a first access point; and
receiving a time measurement from the first access point at the information handling system.

8. A system for profiling rooms within a building, comprising:
client information handling system communicatively coupled to a plurality of wireless local area network (WLAN) access points;
a time-of-flight (TOF) module to send a time measurement request to each of the plurality of WLAN access points to receive TOF data at the information handling system;
a received signal strength indicator (RSSI) module to determine an RSSI value of a communication link between the information handling system and each of the WLAN access points; and
a comparison module to compare the RSSI value and the TOF value between the client information handling system and each of the plurality of WLAN access points to detect a reduction in power of a wireless signal of the communication link indicated by the RSSI value of the wireless signal passing through a barrier and to create a location fingerprint of plural RSSI values and TOF values for the plurality of WLAN access points for location data points associated with a location of the client information handling system.

9. The system of claim 8, further comprising:
a data storage device that maintains data comprising location data points for a location of the client information handling system including
the RSSI value,
the TOF value and
a media access control (MAC) address associated with each WLAN access point.

10. The system of claim 8, wherein the comparison module compares the RSSI to a TOF signal between the information handling system and the plurality of WLAN access points by determining whether the reduction in power of the RSSI exceeds a threshold value, and wherein the threshold value is between 6 and 10 decibels (dB).

11. The system of claim 8, wherein the comparison module iteratively compares the RSSI to the TOF signal between the client information handling system and the plurality of WLAN access points as the location of the client information handling system changes.

12. The system of claim 8, further comprising
a clustering module to cluster location data points associated with the client information handling system over time at a plurality of locations to define, using the comparisons between the plurality of RSSI values and TOF values from the plurality of WLAN access points, the barriers of a room the client information handling system resides within.

13. The system of claim 8, further comprising:
a clustering module to cluster, using an unsupervised clustering process, determined location fingerprints associated with the information handling system using the comparisons between the individual RSSI and TOF signals between the individual location data points and the plurality of WLAN access points; and
the clustering module to define barriers around the information handling system and the plurality of WLAN access points based on the clustered location fingerprints.

14. The system of claim 8, further comprising:
the TOF module, for the client information handling system and each of the plurality of WLAN access point paired with the client information handling system configured to
sends a request for time measurement from a first information handling system to a first WLAN access point, and
receive a time measurement from the first WLAN access point at the first data point.

15. A method of defining an architectural space into identifiable rooms having barriers, comprising:
with a networked client device, communicatively coupling the networked device to a plurality of WLAN access points;
iteratively
determining a time-of-flight (TOF) value indicating a distance from the networked device to each of the WLAN access points to determine a location of the networked device;
iteratively detecting a received signal strength indicator (RSSI) value during communication with each of the plurality of WLAN access points;
iteratively creating comparison data descriptive of the RSSI values relative to each TOF value to determine a decrease in power of the RSSI value versus the TOF value;
creating location fingerprints including the plurality of RSSI values relative to the plurality of TOF values descriptive of plural locations of the networked client device relative to the plurality of WLAN access points; and
clustering the location fingerprints to correlate decreases in power of the RSSI values relative to the TOF values and to determine barriers around the networked client device based on the plural locations.

16. The method of claim 15, wherein clustering the location fingerprints comprises implementing an unsupervised clustering process to determine a plurality of determined barriers defining a room based on the determined barriers.

17. The method of claim 15, wherein determining the decrease in power of the RSSI values versus the TOF values comprises determining whether the decrease in power of the RRSI values exceeds a threshold value, wherein the threshold value is between 6 and 10 decibels (dB).

18. The method of claim 15, further comprising:
with a settings module, receiving input descriptive of a number of settings associated with the networked client device; and
based on a determination that the networked client device is within an identifiable room, initiating the number of settings.

19. The method of claim 15, further comprising:
determining the location of the WLAN access points based on a triangulation process.

20. The method of claim 15, wherein data associated with the location fingerprint of the networked device is propagated through the WLAN access points.

* * * * *